United States Patent

Landa et al.

Patent Number: 5,779,752
Date of Patent: Jul. 14, 1998

[54] THERMOBARIC QUENCHING

[76] Inventors: Leonid M. Landa; Ksenia A. Landa, both of 218 S. Fifth St., Jeannette, Pa. 15644

[21] Appl. No.: 393,132

[22] Filed: Feb. 21, 1995

[51] Int. Cl.⁶ .................................................. C03B 9/14
[52] U.S. Cl. ........................................ 65/68; 65/72; 65/85
[58] Field of Search ............................. 65/65, 80, 83, 65/85, 68, 72

[56] References Cited

U.S. PATENT DOCUMENTS

| | | | |
|---|---|---|---|
| 3,970,442 | 7/1976 | Gulotta | 65/65 |
| 4,013,437 | 3/1977 | Northup | 65/80 |
| 4,582,655 | 4/1986 | Greener | 65/83 |
| 4,840,656 | 6/1989 | Ziegler | 65/85 |
| 5,322,541 | 6/1994 | Shimizu | 65/85 |

*Primary Examiner*—Timothy Speer
*Attorney, Agent, or Firm*—Dennison, Meserole, Pollack & Scheiner

[57] ABSTRACT

The present invention pertains to an apparatus for forming glass. The apparatus comprises a mold for holding molten glass. Additionally, the apparatus comprises a mechanism for applying pressure to the molten glass in the mold. The apparatus comprises a controller for controlling the applying mechanism such that pressure is applied to the glass at predetermined times. The present invention pertains to a method for forming glass. The method comprises the steps of placing molten glass in a mold. Preferably, the placing step includes the step of placing the molten glass at a temperature greater than 800° C. into the mold. Next there is the step of applying pressure greater than ambient pressure to the molten glass in the mold. Before the applying step, there is preferably the step of cooling the molten glass to a predetermined temperature. The applying step preferably includes the step of applying the pressure until the pressure reaches a peak when the molten glass is cooled to a quench temperature $T_q$. Preferably, the applying step includes pressing a solid cooled quencher, such as a plate having piping with coolant flowing through it, against the molten glass. Preferably, the applying step includes the step of applying a peak pressure of 50–100 atmospheres when the temperature of the molten glass at its surface is greater than or equal to $T_q$. Then there is the step of cooling molten glass while applying the pressure. The cooling step preferably includes the step of cooling the glass at the peak pressure until the glass at its center has reached a temperature of $T_b$. After the cooling step, there is preferably the step of reducing the pressure to ambient pressure. Next there is the step of solidifying the molten glass.

8 Claims, 5 Drawing Sheets

Step a

Casting of glass melt into matrix, 1000-1200°C

Step b

Forming and Quenching by solid quencher, 800 ⟶ 370°C
50-100 atm

THERMOBARIC QUENCHING

FIELD OF THE INVENTION

The present invention is related to a method and apparatus for strengthening of glass. More specifically, the present invention is related to the strengthening of glass in which quenching and molding of glass are combined in one operation.

BACKGROUND OF THE INVENTION

The use of glasses in construction was always defined by the necessity to combine two requirements: 1) a construction must be transparent for a specific spectral radiation (ultraviolet, visible, infra-red); 2) interior volume of a construction (car, airplane, house, submarine, etc.) must be insulated from the outside space. This can also include additional requirements for heat insulation, sound proofing, high protection from water, air, dust penetration, mechanical influence.

However, another use of glass in construction is possible—the use for decoration (finishing). In this case, other properties of glasses are utilized, first of all—aesthetic, as color and glaze, texture or transparency, as well as its unique durability, both chemical (no corrosion), and biological (no fungi decay, no aging or rotting/decomposition). The durability of modern building glass under ordinary conditions of exposure (weathering) is so excellent that the possibility of its deterioration is usually ignored.

The chief factor limiting the use of glass is its strength—its mechanical resistance and hardness, its ability to resist mechanical influences on exploiting, on transportation, or both, without destruction. The demand has now grown for glasses with increased strength (mechanical strength) in modern architecture and other fields. Unlike for metals or plastics, strength of glass is not its physical property, because it is determined not with its composition, but by the nature and condition of its surface mainly.

Strength of a material is defined as the magnitude of the applied stress which causes spontaneous fracture. The average strength of ordinary glasses varies within 25–100 MPa.

The influence of glass composition on its strength can be illustrated by the following example: strength of monocomponent quartz glass is higher than that of a regular window multicomponent glass by 30–40%, while the strength of various samples inside each series of quartz or window glasses can differ by 5–6 times.

A very wide variation of strength which is always found when a number of apparently similar specimens of glass are tested, is dealt with using statistical basis, and is explained by the existence of zones of weakness, or flaws, on the glass surface (see, for example, "Strength of Glasses" by A. K. Varshneya in "Chemistry of Glasses", A. Paul, 2nd ed., 1990, p. 140–156). Obviously, to obtain information on strength, a considerable number of specimens must be subjected to any particular test, and each specimen has an increased risk to break on the dangerous surface defects (flaws).

Another feature of glass is its brittleness. When broken glass splinters into fragments with razor-like edges, i.e., glass is broken practically without plastic deformation. Although glass is in fact eight to ten times stronger in compression than it is in tension, it is the tensile, not compressive, strength which determines its effective usage, and ability to resist impact and withstand wind and hydrostatic pressures. So, actually, the factor limiting the use of glass in construction is its strength on tension or bending.

It is important that experimentally observed strength (tensile or bending) of glass is hundreds of times lower than its theoretical strength, which is about $1.4 \times 10^4$ MPa (K. Varshneya). This gives an opportunity to increase mechanical strength of real glasses.

Unsafe destruction of glass can be eliminated in laminated glass (triple glass), where two inorganic glass sheets are stuck together by organic film put between them. This film does not contact neither with interior, nor with exterior volume in a certain construction where laminated triple glass is used. When broken, such glass fragments remain stuck to the film.

To increase strength of glass, different methods are used in two main directions:

1) Improvement of the surface—by fire finishing, chemical etching, film coating, deposited onto the surface by sputtering or in chemical reaction. 2) Creation of compressive stresses σcompr by ion exchange or quenching.

In the first group of methods risky defects are "healed" or eliminated, thus increasing the minimal strength of glass.

In the second group of methods the strength limit is increased, so that glass destruction now occurs at larger stresses applied to it, because in order to break strengthened glass, one should apply stress equal to $\sigma_s$, and compensate stress σcompr. Some of the known methods of strengthening of glass are described below.

Etching

The surface layer of about 50–150 microns thick is removed from glass. The strength of glass is increased in 8–10 times, and the value of strength 500–600 MPa is achieved. This process requires up to 40 min., is difficult to control and involves toxic acids; it is not convenient for large-scale production. Besides, the etched surface, which is defectless, must be protected by film coating (best of all—silicone-organic film).

Coatings

Metal oxides, organic and silicon organic substances are used to create coating thin fiber on the pre-heated glass surface, which can be treated in solution, or in vapors of hydrolyzed salts, or by spray. After the protecting film is created in a chemical reaction on the surface, the strength of glass can be increased 1.5–2 times.

Ion exchange

Researchers have explored two general methods for ion exchange strength of glass: high temperature and low temperature, depending on whether it is carried out higher or lower $T_g$, which is characteristic temperature of vitrification (glass formation) for a given glass of certain composition.

Glass solid state is different from crystalline solid state—glass does not melt at specific temperature, melting point, but it transfers, monotonously into liquid, on heating, in the temperature interval $T_g$–$T_f$. Below $T_g$, glass is solid, above $T_f$ glass is liquid. $T_g$ and $T_f$ are upper and lower temperatures of the vitrification interval and depend on glass chemical composition. Each glass has its own interval $T_g$–$T_f$, but all glasses have the same viscosity at $T_g$ and at $T_f$. $T_g$ corresponds to viscosity of $10^{12.6}$–$10^{13}$ Pa·s, $T_f$ corresponds to viscosity of $10^8$ Pa·s.

Here are some figures for regular industrial glasses: for quartz glass $T_g$=1553K, $T_f$=1773K; for Pyrex glass $T_g$=873K, $T_f$=973K; for (sheet) window plain glass $T_g$=823K, $T_f$=973K. Intervals of glass formations (vitrification) are 250K; 100K; 150K correspondingly.

High-temperature ion-exchange is carried out at 800–1000K. Glass is inserted into salt melt, and the larger ions of glass matrix as Na+ or K+, are substituted by smaller ions from the salt melt, by L+ ions.

This process takes up to 4 hours. Li+ ions penetrate into glass surface and create 150–200 microns thick layer, where compressive stresses arise, strengthening the glass 2–2.5 times. This effect results from the difference in expansion coefficients; the layer after ion exchange has lower linear expansion than the virgin glass substrate, and the interaction of the surface layer with the volume bulk glass causes stresses of compression in their layer, responsible for strengthening.

Low-temperature ion exchange is carried out at 700–750K, while smaller ions of glass (Li+ or Na+) are substituted by larger ions of the salt melt in contact (Na+, K+, Rb+, Cs+), thus creating 20–40 microns thick layer. This layer is more dense than the bulk glass, and it intends to expand, but is restricted by rather "rigid" inner layers—so compressive stresses arise. This process is more effective, than low-temperature; strength can be increased 3–7 times, and achieve 600–700 MPa, but the layer is thinner, and more easily damaged. Process takes 0.5–7 hours.

Quenching

Substantial permanent compressive stresses can be created in glass by fast cooling from temperature $T_q$, while $T_g < T_q < T_f$ ($T_q$-quenching temperature).

The nature of glass quenching differs from that of metals, e.g., steel. Steel must be heated to the temperature above the temperature of phase transition "$\alpha$-modification$\rightarrow\beta$-modification." On slow cooling reverse transition $\beta\rightarrow\alpha$ takes place. But if steel is cooled very fast, the reverse transition has no time to occur, and high-temperature $\beta$-modification remains in steel at room temperature.

Quenching of glass lies in the fact that at temperatures above $T_g$ stresses arise in glass that do not relax when glass is cooled fast. Best conditions for glass quenching (hardening) are observed if glass is heated to the temperature $T_q = T_g + 50-80K$. If glass is heated to higher temperatures than $T_q$, the stresses that appeared would relax fast, and anyway would not remain in glass even on fast cooling.

Effectiveness of quenching depends on the thickness of glass (the thicker, the better) and on coefficient of heat irradiation; these two parameters of the system "glass-quencher" determine intensity of cooling and rise of temperature gradient, consequently, rise of stresses, responsible for strengthening.

In order to increase the intensity of cooling, maximum contact between cooled glass and quencher is desired. Therefore, to provide such contact, liquid or gas (which is compressible liquid in terms of airdynamics) are used as quenchers. So, at present, quench hardening is being solved in one principle way: "a body being cooled (quenched), which has definite form, gets in contact with a cooling medium (quencher), which takes the shape of the cooled body (specimen)," even considering that different devices, designs and procedures/operations are used.

The most widely used process is air quenching. The most simple variant is air quenching on natural convection, when a piece of glassware is taken from hot furnace and cooled on air. The intensity of cooling can be increased by using airjet grill (air spurt, air stream, directed onto glass). This allows to quench thinner specimens (4–6 mm) and to increase quenching stresses up to 250 MPa (at initial strength 60–80 MPa). One of disadvantages of the last method is uneven quenching by flushing air, resulting in defects, called "quenching spots."

Liquid quenchers—mineral oils, silicon organic compounds, metal melts,—provide more intensive heat-exchange. If glass is immersed into liquid, the process is similar to convectional air quenching. If liquid is used in the form of spray—the process is similar to air-jet quenching (air-blast). Several problems exist with the process. If a melted metal is used as a quencher ($\approx$900K), then it is difficult to immerse a specimen into it because of the very high density of such melt, though such quenchers are suitable for glasses with high $T_g$ and low thermal expansion coefficient.

For mineral oils and silicon-organics their coefficients of heat irradiation are temperature dependent, and this requires special liquid selection for each type of glass. Besides, liquid quencher starts boiling on immersion of hot glass, which changes coefficient of heat irradiation between contacting surfaces and makes it difficult to control the process of quenching. Finally, on immersing of large specimens the parts of it cool unevenly (upper and lower parts). This creates temperature gradient not into the depth, but along the surface, and this effect is negative. In general, liquid quenching allows to create compressive stresses of about 300–500 MPa, and to increase strength of conventionally annealed glass 4–6 times.

It is important to emphasize that pressure is not used in the presently known methods of strengthening of glasses.

Forming of a piece of glassware (actually, "deformation of a glass melt") is based on the same glass feature, that quenching, but used in another way.

This special feature of glass is the way of its transformation into liquid on heating, which occurs not at a fixed temperature, as for crystals, but in an interval of temperatures from $T_g$ to $T_f$ monotonously. Above $T_f$ glass is liquid. On cooling this liquid does not crystallize, but, also monotonously, becomes solid glass. Besides, viscosity of glass strongly depends on its temperature, and this dependence is utilized in the process of forming (molding). Glassware can be formed by molding (pressing), blowing, rolling (pressed or molded glass, blown glass, rolled glass). The process of forming of a glass article starts at temperatures above $T_f$ corresponding to viscosity of glass melt $10^2-4.10^7$ Pa·s, because liquid can change its shape (form) easily at very small loads of 0, 1-0, 2 MPa (effort of press-mold). After the loading is removed, below $T_f$ but above $T_g$, glass fixes its form/shape already without outside mechanical influence, i.e., without loading. So pressure is also not used in the known methods of forming glasses at viscosity higher than $10^8$ Pa·s.

SUMMARY OF THE INVENTION

The present invention pertains to an apparatus for forming glass. The apparatus comprises a mold for holding molten glass. Additionally, the apparatus comprises a mechanism for applying pressure to the molten glass in the mold. The apparatus comprises a controller for controlling the applying mechanism such that pressure is applied to the glass at predetermined times.

The present invention pertains to a method for forming glass. The method comprises the steps of placing molten glass in a mold. Next there is the step of applying pressure greater than ambient pressure to the molten glass in the mold. Before the applying step, there is preferably the step of cooling the molten glass to a predetermined temperature. The applying step preferably includes the step of applying the pressure until the pressure reaches a peak when the molten glass is cooled to a quench temperature $T_q$. Preferably, the applying step includes pressing a solid cooled quencher, such as a plate having piping with coolant flowing through it, against the molten glass. Preferably, the applying step includes the step of applying a peak pressure of 50–100 atmospheres when the temperature of the molten glass at least on its surface is greater than or equal to $T_q=T_g+(50°$ to $80°)$. Then there is the step of cooling molten glass while applying the pressure. The cooling step preferably includes the step of cooling the glass at the peak pressure until the glass at its center has reached a temperature of $T_b=T_g-(150°$ to $170°)$. After the cooling step, there is preferably the step of reducing the pressure to ambient pressure.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 5:
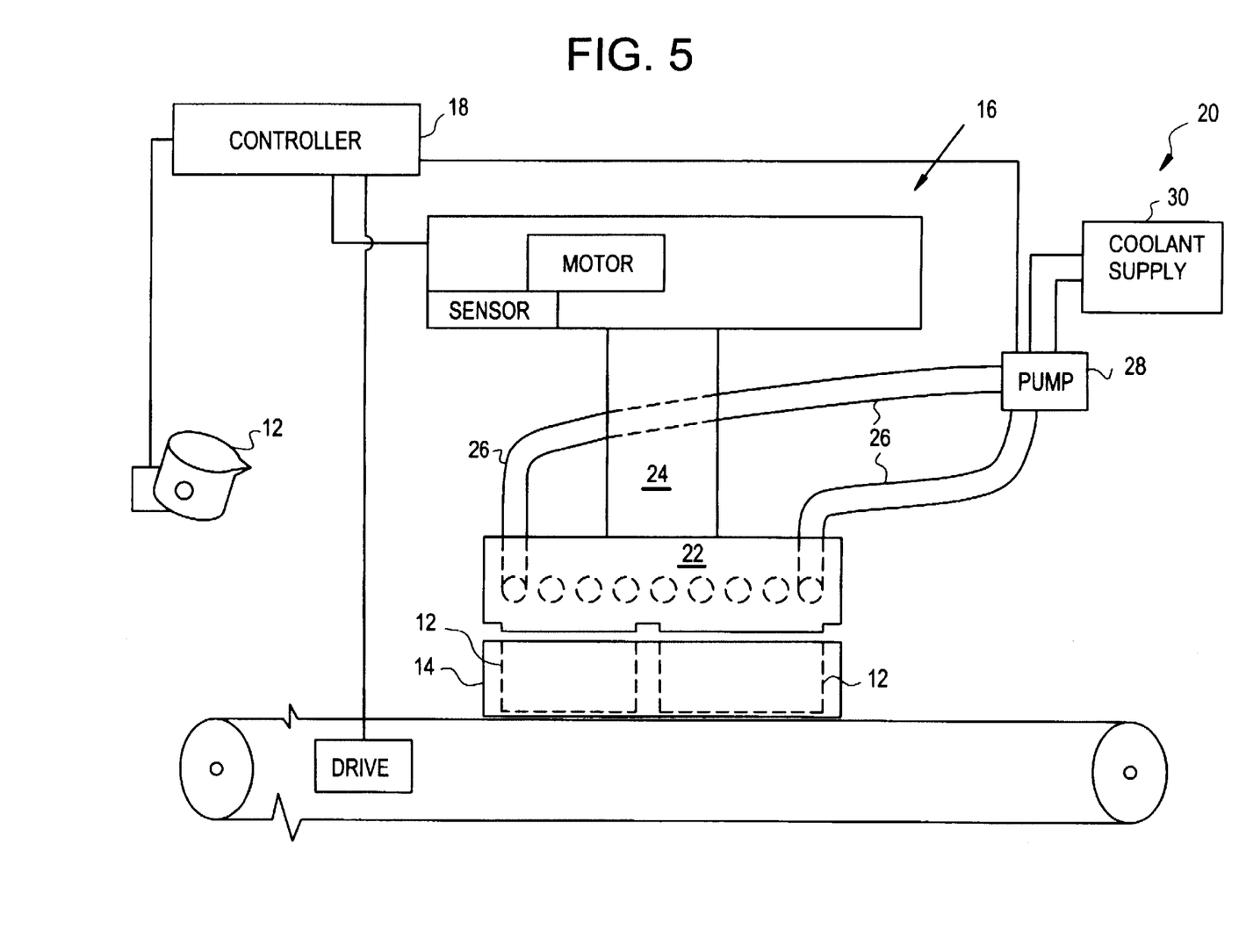
FIG. 5 is a schematic representation of an apparatus for forming glass of the present invention.

Referring now to the drawings wherein like reference numerals refer to similar or identical parts throughout the several views, and more specifically to FIG. 5 thereof, there is shown an apparatus 10 for forming glass 12. The apparatus 10 comprises a mold 14 for holding molten glass 12. Additionally, the apparatus 10 comprises a mechanism 16 for applying pressure to the molten glass 12 in the mold 14. The apparatus 10 comprises a controller 18 for controlling the applying mechanism 16 such that pressure is applied to the glass 12 at predetermined times.

Preferably, the applying mechanism 16 includes a mechanism 20 for cooling the glass 12. Preferably, the applying mechanism 16 includes a plate 22, and a ram 24 connected to the plate 22 which forces the plate 22 against the glass 12.

Preferably, the cooling mechanism 20 includes piping 26 which is attached to the plate 22, a pump 28 connected to the piping 26, and a coolant supply 30 connected to the pump 28 which pumps coolant from the coolant supply 30 to the piping 26 to cool the plate 22 when the plate 22 is in contact with the glass 12. The plate is preferably metal. The advantage of using a solid quench such as a plate is the pressure applied by the plate 22 to the glass can be constant across the glass. A fluid (gas or liquid) generally cannot reproducibly accomplish this constant pressure across the glass. Also, the solid quencher can be cooled in a controlled manner so the glass is not cooled too quickly, resulting in possible cracking or damage to the glass. With a fluid, the cooling of the glass could occur too fast and the fluid is typically not as easily controllable in regard to its temperature at the glass surface as is the solid quencher.

The present invention pertains to a method for forming glass 12. The method comprises the steps of placing molten glass 12 in a mold 14. Preferably, the placing step includes the step of placing the molten glass 12 at a temperature greater than 800° C. into the mold 14.

Next there is the step of applying pressure greater than ambient pressure to the molten glass 12 in the mold 14.

Before the applying step, there is preferably the step of cooling the molten glass 12 to a predetermined temperature. The applying step preferably includes the step of applying the pressure until the pressure reaches a peak when the molten glass is cooled to a quench temperature $T_q$. Preferably, the applying step includes pressing a solid cooled quencher, such as a plate 22 having piping 26 with coolant flowing through it, against the molten glass 12. Preferably, the applying step includes the step of applying a peak pressure of 50–100 atmospheres when the temperature of the molten glass 12 on its surface is greater than or equal to $T_q=T_g+(50°$ to $80°)$. Then there is the step of cooling molten glass 12 while applying the pressure. The cooling step preferably includes the step of cooling the glass 12 at the peak pressure until the glass 12 at its center has reached a temperature of $T_b=T_g-(150°+170°)$. After the cooling step, there is preferably the step of reducing the pressure to ambient pressure. Below $T_g$, the glass has entered the solid state so the glass has already solidified when the pressure is reduced to ambient pressure by, for instance, lifting the plate 22 off of the glass 12.

In the operation of the preferred embodiment, molten crown glass at a temperature greater than 800° C. is placed into a mold 14. No wetting agents or non-sticking agents need coat the mold. The glass is not reactive with the metal of the mold. The mold 14 can have a singular chamber to form one single plate of glass or can be multi-chambered to form many plates of glass of desired shape. The mold 14 is on a conveyor belt or a carousel. At the beginning part of the conveyor belt, the molten glass 12 is first introduced to the mold 14. The conveyor belt then moves the mold 14 under the ram 24, and subsequently moves the mold 14 away from the ram 24 when the pressure quench step is complete.

The mold is positioned below a plate 22 connected to a ram 24. The plate 22 is moved downward under the action of the ram 24 to contact the surface of the glass 12 in the mold 14. At this point, the molten glass 12 has cooled somewhat, but is above 610° C. The plate 22 has piping 26 attached to it with water flowing in the piping. The water is pumped through the piping 26 by a pump 28 that is connected to a coolant supply 30. The type of glass 12 being molded is identified to the controller 18. By knowing the identity of the type of glass 12 being molded, the time it takes for the glass 12 in the mold 14 to reach various critical temperatures such as $T_q$ and $T_b$ is determined. Based on the thermal transfer properties of the various materials of the parts of the process, such as that of the mold, atmosphere, press, etc. and the density, thickness and temperature of the same, and the surface areas interfaced between these elements, these temperatures $T_q$ and $T_b$ are identified. Thus, previously obtained calibration curves for each type of glass are used in the manufacturing process to time when the various steps will occur of the process. See "Chemistry of Glasses" by A. Paul, Publisher Chapman and Hall Ltd. 1982 for further information concerning identification of $T_g$ and viscometry in regard to various glasses, incorporated by reference.

The ram 24 increases force against the plate 22 as the molten glass 12 continues to cool. The force from the ram 24 on the plate 22 and thus from the plate 22 against the molten glass 12 in the form of pressure reaches a peak between 50–100 atmospheres when the molten glass is cooled to a temperature greater than or equal to 610° C. ($T_q=T_g+(50°$ to $80°)$) at the surface of the glass. The increase in pressure can be in the form of a step function or a continuous function to the maximum pressure. As the plate 22 presses against the molten glass 12, there is no leakage of glass 12 at the edge of the plate 22 which just fits within the mold 14 because the molten glass 12 at the edge has already cooled to the point where it solidifies and essentially forms a plug along the edge to prevent the molten glass 12 that has not cooled to such a temperature from squeezing out between the edge of the plate 22 and the mold 14. Pressure sensors on the plate 22 monitor the pressure or force sensors in the ram 24 monitor the force and provide the information through signals to the controller 18.

The plate 22 under the action of the ram 24 maintains the maximum pressure while the water continues to flow through the piping 26 attached to the plate 22. The water flowing through the piping 26 serves to further cool the glass 12. The plate 22 does not rise above 100° C. The plate 22 typically stays in place about 30 seconds.

The maximum pressure is maintained on the glass until the center of the glass has cooled to a temperature of 370° C. ($T_b=T_g-(150°$ to $170°)$). When the center of the glass has cooled to 370° C. ($T_b$), the force from the ram 24 on the plate 22 is removed. The plate 22 can be lifted or maintained in place without essentially any force except its own weight from gravity on the glass to facilitate further cooling due to the water flowing through the piping 26 depending upon the application and choice of the user. Once the glass has cooled to 370° C. ($T_b$), the mold 14 is removed from the relationship with the plate 22. The glass 22 has now solidified and the glass slate or slates that have formed are removed from the mold 14 by established techniques. The example described herein focuses on crown glass, but the process is not limited whatsoever to crown glass. The entire process can occur in an environment of ambient temperature and pressure, such as a typical factory floor.

Generally, thermobaric quenching is a new process of manufacturing of glassware, based on new phenomena and regularities, discovered by the authors of this invention. These phenomena relate to physical chemistry and thermodynamics of non-crystalline solids, and reflect the dependence of the structure and properties of glass on pressure.

It is known from thermodynamics that condition of a substance is the function of outside parameters and temperature. In the absence of electrical and magnetic fields, pressure is the sole outside parameter which determines the condition of a macrosystem.

This parameter was heretofore practically not considered and not used with glasses.

Only in manufacturing of quartz glass pressure of about 2-3 MPa is applied to the glass fluid in order to eliminate gases because at temperature of about 2300–2500K gases could be dissolved under pressure, before glass melt is casted. As it was mentioned above, even lower pressure 0.1–0.2 MPa is used in molding.

In case of crystals, pressure can cause phase transition, e.g., "graphite→diamond", or elastical deformation, or destruction. It was a common knowledge and supposition that the sole result of pressure influence on glass is elastic deformation. Research showed (L. M. Landa, K. A. Landa. Crystalloides and polymorphirm in glasses. XVI Congress on glass, Madrid, 1992, p. 533–538), that this knowledge is not complete. If glass is subjected to pressure and heat, then after it returns into initial normal conditions (P=1 atm, T=25° C.), the enthalpy changes can appear to be not zero:

$$\Delta H=\Delta U+P\nabla+V\Delta P\neq 0, \quad (1)$$

where $\Delta U$ - change in internal energy,

P - pressure,

V - volume of a system, $\Delta H$ - the change in enthalpy.

The effect (1) can be conditioned by two reasons. First, it can be phase transition resulting from the changes in local order (structure) of glass. This phenomenon is similar to polymorphism in crystals (existence of different structures for the substance of the same chemical composition), and it was named "amorphous polymorphism" (L. M. Landa. "Polymorphism and crystallites in glasses." - Reports of Academy of Sci. USSR. 1985, v. 288, NY, p. 918–921). In this case ($\Delta U+P\Delta V)\neq 0$. Second, residual pressure can be fixed by glass, i.e., internal pressure in the system (in glass in the case under consideration) will not be equal to external pressure. That means, $V\Delta P\neq 0$ (L. M. Landa. "Thermodynamical stability of metamict silica at standard conditions."—Rep. Acad. Sci. USSR. 1988, v. 303, N1, p. 136–139).

The first result ($\Delta U+P\Delta V\neq 0$), related to phase transitions in amorphous material (glass), is conditioned by the possibility of the existence of different local structures (local order built in different ways) in substance of a given chemical composition. Thus, for pure silica, $SiO_2$, six-fold coordination of silicon with respect to oxygen, is possible at pressures 14–16 GPa and higher.

At pressures lower than those, different structures can be formed of rings, combining 4, 6 or 8 silicon-oxygen tetrahedra (four-fold coordination of silicon with respect to oxygen, $|SiO_4|$- tetrahedron, is a structural unit in these structures). Therefore, if, under the influence of high pressure and high temperature, glass changes its local order, then, after it returns to normal conditions, the high-pressure local order can be preserved in glass, which will be characterized by different value of ($\Delta U+P\Delta V$), compared to initial state.

The second result ($V\Delta P\neq 0$) is due to the fact that glass, if cooled under high pressure, will not be able to relax after solidification of the surface layer,—the inner layers and bulk glass will become solid under surplus pressure. Therefore, the decrease of the outside pressure will not change the internal pressure of the system, consequently, so far as $\Delta P\neq 0$, then $V\Delta P\neq 0$, of equation (1).

The first result (effect) shows a possibility of obtaining of amorphous polymorphs—glasses with novel advanced properties, owing to structural changes, similar to the known crystal polymorphs, e.g., of carbon—graphite and diamond (high-pressure modification).

The second result allows to carry out thermobaric quenching of glass, i.e., to use baric quenching for additional strengthening along with thermic quenching.

Figure 1:
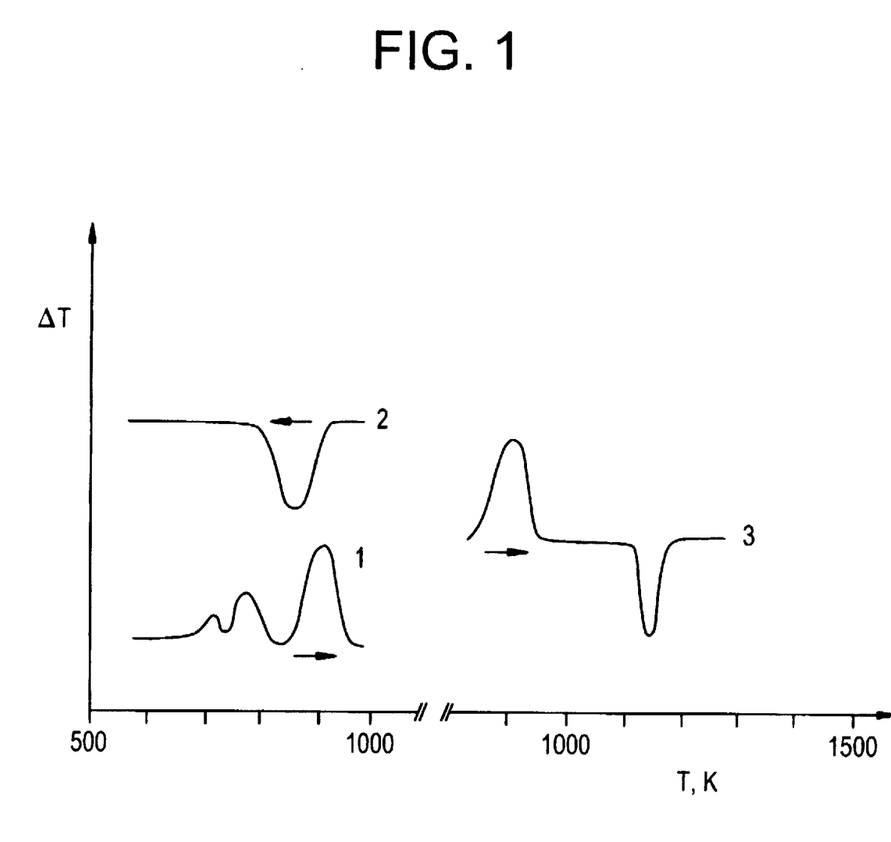
FIG. 1 is a thermogram of borosilicate glass.
Figure 2:
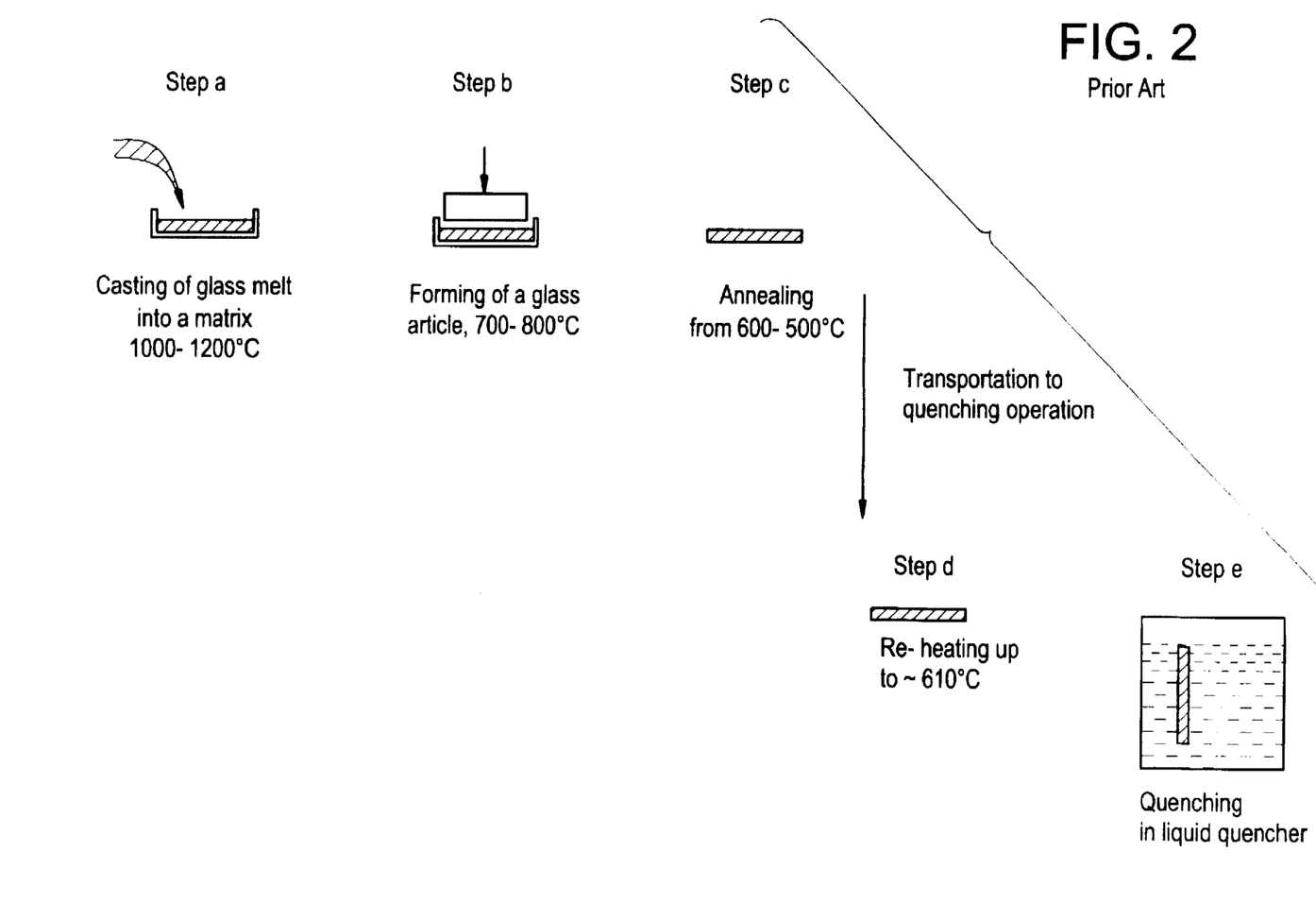
FIG. 2 is a schematic representation of a prior art quenching process in the glass industry.
Figure 3:
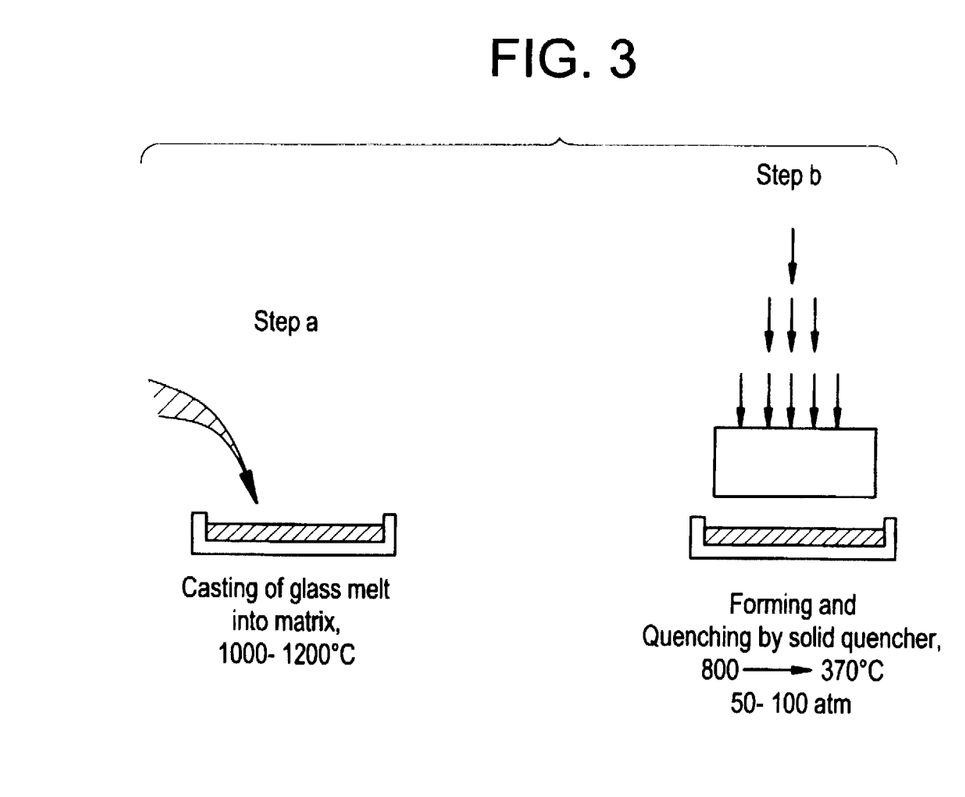
FIG. 3 shows the steps of practicing the present invention, where quenching and forming (molding) of a glass sample are facilitated in one operation.
Figure 4:
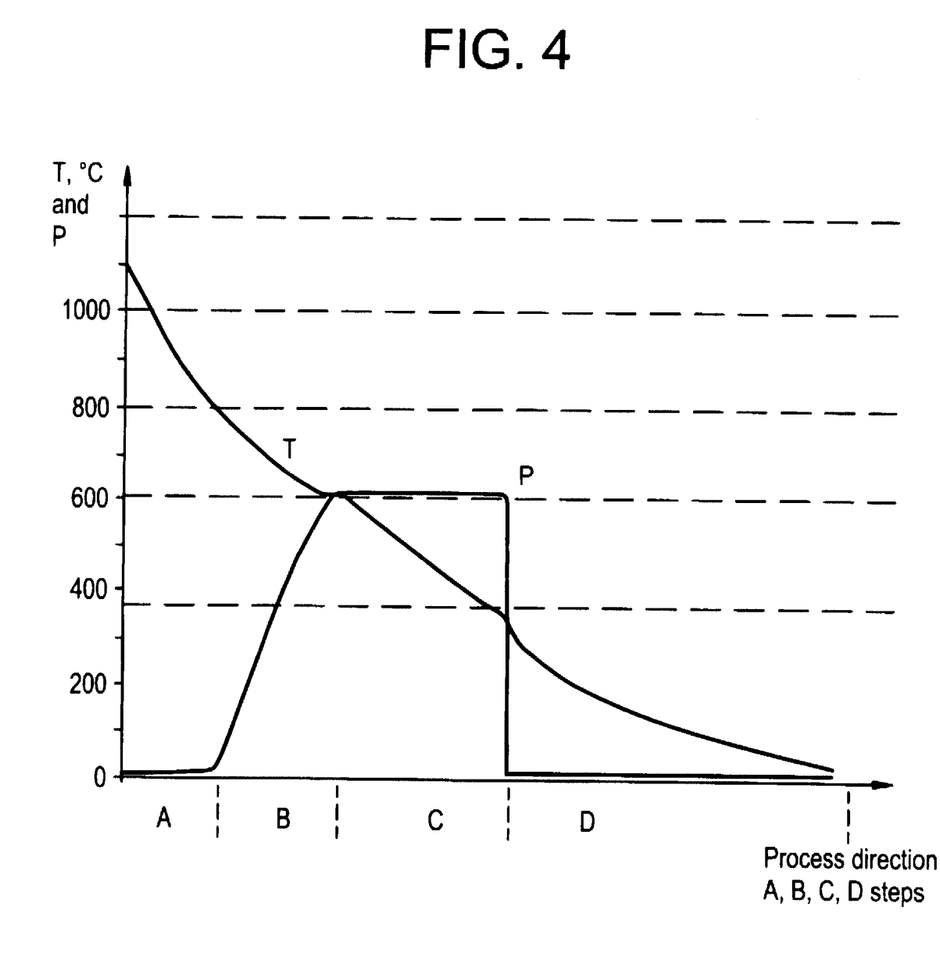
FIG. 4 is a graph showing pressure and temperature change in the process of the present invention.

The two effects described above can be observed on annealing of glass, which was previously subjected to thermobaric treatment. Annealing is carried out at normal outside pressure, and the change of structure and properties of a glass specimen are followed by thermic effects which can be experimentally determined. FIG. 1 shows the experimental thermogram for borosilicate glass (crown type glass). Composition of the glass studied, mass %: 69 $SiO_2$, 11 $B_2O_3$, 10.5 $Na_2O$, 6.5 $K_2O$. Glass was exploded with benzoyl peroxide. Heating and cooling of the exploded glass (resulting powder) reveals three effects (FIG. 1).

A. Non-reversible endothermic effect of about 4 KJ/mole at 700–800K, i.e. below $T_g$-813K (curve 1).

B. Reversible, endothermic on heating effect of about 13 KJ/mole at 900K (curves 1, 2, 3). This effect is characterized by "antihysteresis", i.e., endothermic effect on heating begins at temperature lower than that of the beginning of exothermic effect on cooling.

C. Non-reversible exothermic effect of about 3.5 KJ/mole at T>1170K. (Curve 3). It characterizes melt to melt transition, i.e., transformation of the "exploded" glass melt to the "initial glass melt." The latter gives initial crown glass on cooling.

The value of low-temperature effect, V$\Delta$P=4 KJ/mole, molar volume of glass being about 25 cm$^3$/mole, the fixed (by glass) pressure is $\Delta$P=160 MPa. This value corresponds to possible strengthening by thermobaric quenching.

Thermobaric quenching is a pioneering principle, based on the connection between the low-temperature peak on the thermogram (FIG. 1, curve 1) and the possibility of strengthening of glass.

Similar to the existence of the characteristic for each glass temperature $T_q$ for thermal quenching process, there is characteristic temperature for baric quenching, $T_b$—new, not known before characteristical temperature, which we define as the temperature, at which basically created (by pressure) stresses can begin to relax, and before which those stresses do not relax, $T_b < T_g$. Like $T_g$ and $T_q$, $T_b$ can be determined from experimental data. We determined $T_b$ for several glasses, the same way it was described for crown glass, for which $T_g$=813K, $T_b$=643K (FIG. 1). For a glass of the following composition (mass. %): 53 SiO$_2$, 16B$_2$O$_3$, 9Al$_2$O$_3$, 16K$_2$O, $T_g$=853K, $T_b$=573K. (All initial experimental thermograms are at our disposal and can be submitted.)

Thermobaric quenching is a new process in glass manufacturing, which combines molding (forming) of glassware with strengthening into on-line quenching, integral with the molding glass-making stage. This integration is important itself, because it excludes the separate stage of quenching (liquid quenching, air quenching), but what is most important—in the new process invented both processes combined in one stage, molding and quenching, differ significantly from the known similar processes, separated into two stages in the modern technology of glassware production.

The invention differs from the known processes of thermoquenching in utilizing mechanical influence (pressure). It differs from the known molding processes in the fact that pressure is applied to glass not only at viscosity interval 10$^2$-4.10$^7$ Pa·s, but also at viscosity higher than 10$^8$ Pa·s and up to 10$^{13}$ Pa·s, i.e., when glass is already a solid substance.

The essence of the thermobaric quenching is that cooling of glass takes place under pressure until the temperature of glass reaches $T_b$. The pressure can reach the value, corresponding to 30-35% of stresses, capable of breaking glass on compression.

If glassware is being produced by rolling or molding, thermobaric quenching should be carried out in the following way.

1. The effort of the molding or rolling elements, i.e., pressure on glass specimen, is increased to reach its maximum value at temperature not lower than $T_q$ ($T_q = T_g + 50$ to 80K), which corresponds to viscosity 10$^8$-10$^{12}$ Pa·s. Prior to the present invention, mechanical efforts were not applied to a glassware and such viscosity values.

2. The cooling of glass specimen occurs owing to its contact with intensively cooled molds, while the effort of the molds, which reached its maximum at $T_q$, is being kept on this maximum level, till the temperature $T_b$ is reached by glass. The contact between quencher and quenched body is complete, like on liquid quenching, but the way of achieving it is opposite: while in the known liquid quenching a liquid quencher takes the shape of a solid cooled body, in the present invention the surface of liquid glass melt takes the shape of a solid quencher. This process eliminates all the disadvantages of liquid quenching—boiling of a quencher, uneven cooling, problems of immersing of glass detail into a dense cooling liquid.

3. Maximum pressure applied to glass should not exceed 30-35% of glass strength $\sigma_{compr}$ on compression (these $\sigma_{compr}$ figures can be obtained by standard methods if not available from the reference books for regular glasses).

4. Outside pressure (effort of a mold) is removed at $T_b$, after this glass is cooling in the annealing regime.

5. When glass is cooled to the temperature 573-523K (or a little lower), the surface of glass is being protected, from one or both sides, with organic film coating (ribbon-film) 0.5-3.0 mm thick, which sticks to glass by temperature and additional effort (one time) of the molds, or additional devices. This stage is autonomous, and provides safe transportation of glassware and safe mounting. If the coating is one-sided, it should face the interior space on exploitation. This stage differs from the known triple lamination, on which organic film is mounted in between two sheets of silicate glass.

This stage also differs from the known processes of coating: it combines mechanically a glass slate and a film of comparable thickness, while the known coating is the result of a chemical reaction with a very thin film deposited onto glass surface (see, for example, "Glass Researcher", bulletin of Alfred University, New York, V. 1, No. 2, July 1991).

The certain, specific technological processes being developed on the basis of the principle of "thermobaric quenching", require individual determination of the characteristic temperatures $T_b$ for each glass, in the same way, as the known characteristic temperatures $T_g$ and $T_b$ were determined for all the known glasses. The method for $T_b$ determination was described above for the crown glass (FIG. 1).

Besides, the most effective values of the pressures applied, should be defined for glassware articles of different size, shape, configuration. This procedure is similar to the widely used procedure of defining of certain regimes of molding or quenching when known methods are applied to novel compositions of configurations of glasses.

Correlation between the productivity of an apparatus 10 and the regime of cooling is given by:

$$D = \frac{\alpha \times 2S}{c \times m} \quad (1)$$

where

D - the number of glass slates (tiles) produced in a time unit;

$\alpha$ - coefficient of heat irradiation;

C - specific heat;

S - surface area of each contacting pair of surfaces of glass sample and a molding element—a punch or matrix;

Then, $$\alpha = \frac{D \times c \times m}{2S} \quad (2)$$

The productivity of an apparatus, which utilizes the present invention, would be about one tile in 30 seconds. It corresponds to annual output of 10 glass tiles. Consequently, $\alpha$=223. This is quite a real value, since the presently known quenching methods realize $\alpha$=12.5÷550.

The speed of cooling depends on the characteristics of a glass and parameters of the process ($\alpha$, T, $\theta$):

$$\frac{dT}{dt} = -\frac{\alpha}{c\rho} \frac{S}{V} (T - \theta) \quad (3)$$

where θ—temperature of the solid quenchers—punch and matrix, T—temperature of glass, t—time.

If the pressing elements are cooled with water, which is the most common case, then θ≦100° C., and $$\frac{dT}{dt} = \frac{223 \times 0.18 \times 10^6}{1,338 \times 2,520 \times 360} \times 510 \cong 17 \text{ degree/sec.}$$

At this cooling speed, the molding process itself will require 14 seconds, i.e. at least 50% of the time of the process cycle (30 sec/tile) will remain for intermediate operations.

As an example, for a borosilicate glass: $SiO_2$ - 69%, $B_2O_3$ - 11%, $Na_2O$ - 10.5%, $K_2O$ - 6.5%, BaO - 3.0%. For this glass $T_g$=540° C.; $T_\beta$=370° C.; density ρ=2,520 kg/m³ specific heat c=1,338 J/kg° C. The size of a molded slate (tile) is 30×30×0.4 cm³; surface area S=900 cm²=0.09 m²; volume V=36×10⁵ m³. The mass of a slate is m≃0.9 kg.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for forming and strengthening glass comprising the steps of:

placing molten glass in a mold;

applying to the molten glass in the mold a solid, pressure applying means to thereby place the glass under a pressure greater than ambient pressure;

cooling and solidifying the molten glass while applying the pressure; and removing the pressure from the solidified glass.

2. A method as described in claim 1 wherein the applying step includes gradually applying pressure until the pressure reaches a peak when the molten glass has cooled to a quench temperature $T_q$.

3. A method as described in claim 2 wherein the applying step comprises pressing a solid cooled quencher against the molten glass.

4. A method as described in claim 3 wherein the molten glass is placed in the mold at a temperature greater than 800° C.

5. A method as described in claim 4 wherein the pressurizing step includes the step of applying a peak pressure of 50-100 atm when the quench temperature $T_q$ of the molten glass at its surface is greater than or equal to a softening temperature $T_g$.

6. A method as described in claim 5 wherein the the glass is cooled under the peak pressure.

7. A method as described in claim 1 wherein the the solid pressure applying means is cooled to below 100° C. during the applying step.

8. A method according to claim 1 wherein said pressure greater than ambient pressure is applied to a peak pressure of 50 to 100 atm.

* * * * *